UNITED STATES PATENT OFFICE.

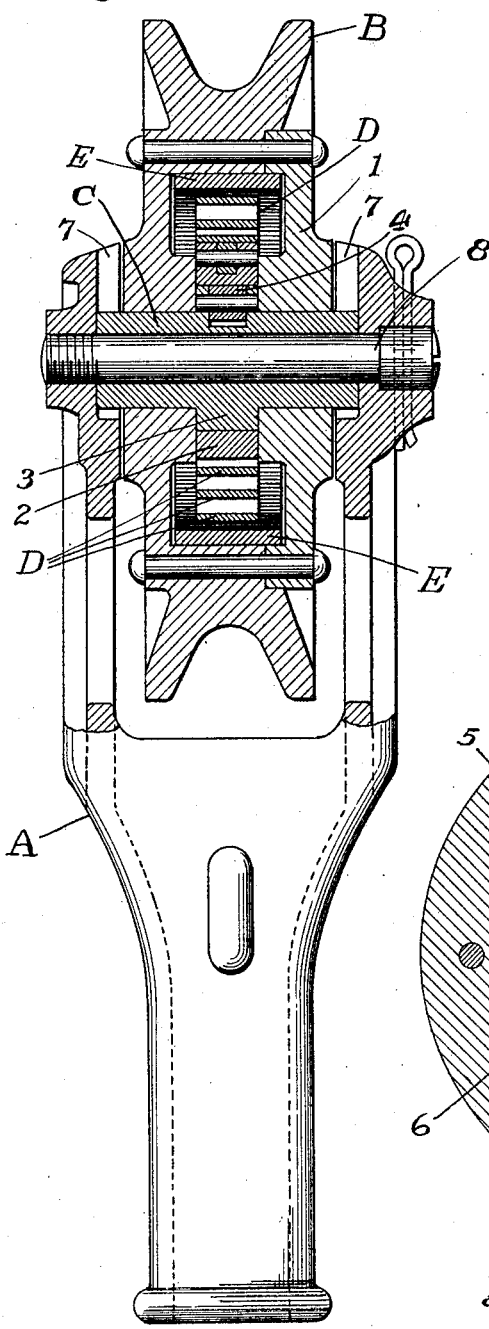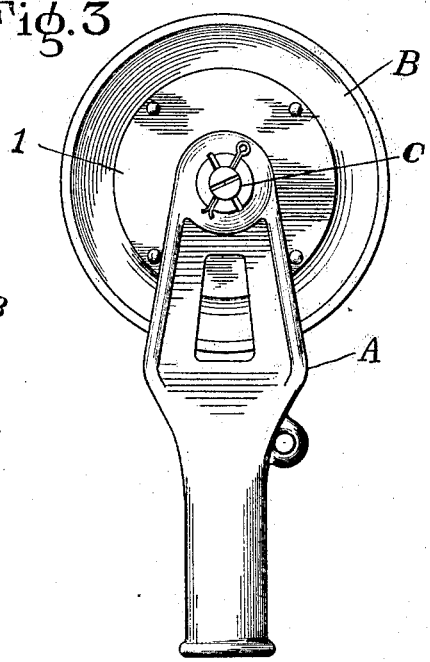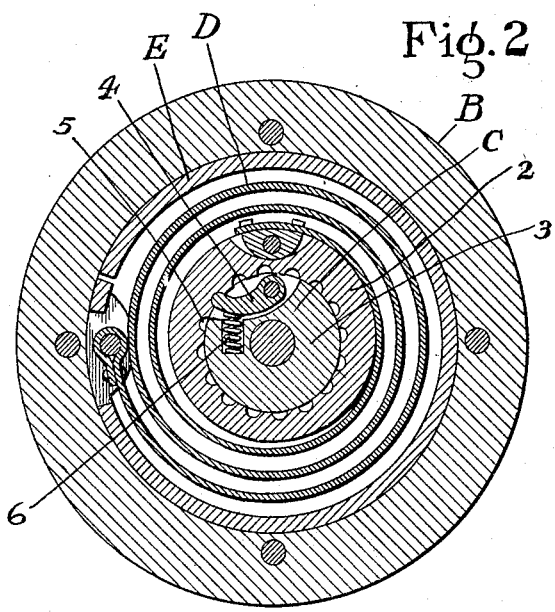

JOSEPH L. GUTWEILER AND FREDERICK W. KUBLIN, OF ST. LOUIS, MISSOURI.

TROLLEY.

1,397,760.

Specification of Letters Patent.   Patented Nov. 22, 1921.

Application filed May 20, 1921.   Serial No. 471,109.

*To all whom it may concern:*

Be it known that we, JOSEPH L. GUTWEILER and FREDERICK W. KUBLIN, citizens of the United States, residing in the city of St. Louis, State of Missouri, have invented a certain new and useful Improvement in Trolleys, of which the following is a full, clear, and exact description, such as will enable others skilled in the art to which it appertains to make and use the same.

This invention relates to trolleys of the type in which the wheel of the trolley is mounted in the harp on the trolley pole in such a manner that the wheel normally has a sliding contact with the trolley wire, but is capable of rotating so as to equalize the wear on the grooved portion of the wheel that receives the trolley wire.

The main object of our present invention is to provide a trolley that has all of the desirable features and characteristics of the trolley described in our pending application Serial No. 386,438, filed June 4, 1920, and which is constructed in such a manner that the wheel will rotate in traveling forwardly over the trolley wire around sharp curves when the trolley wire is arranged diagonally with respect to the groove in the wheel and also when the wheel is traveling under bridges and other relatively low places where the trolley wire exerts more than the usual pressure on the wheel.

Another object is to provide a trolley that comprises a wheel, a coiled spring combined with said wheel in such a way that the engagement of the wheel with the trolley wire holds said spring under tension, and means for permitting the wheel to shift bodily with relation to the spring when the wheel is subjected to a blow from a hanger or other device against which the wheel strikes, thereby causing the "wear" to be distributed more uniformly over the grooved surface of the wheel. Other objects and desirable features of our invention will be hereinafter pointed out.

Figure 1 of the drawings is an end elevational view, partly in vertical transverse section of a trolley constructed in accordance with our invention.

Fig. 2 is a vertical longitudinal sectional view of the wheel of the trolley and the spring and clutch arranged inside of said wheel; and Fig. 3 is a side elevational view of the complete trolley consisting of the wheel and the harp in which the wheel is mounted.

In general design and construction the trolley herein shown is the same as the trolley that forms the subject-matter of our pending application previously referred to. It comprises a harp or forked member A that is adapted to be mounted on the upper end of a trolley pole (not shown), a wheel B mounted in said harp and provided with a groove for receiving a trolley wire or other electrical conductor (not shown), a horizontally-disposed shaft or axle C mounted in said harp so as to form a support for the wheel B, a coiled spring D combined with said wheel in such a way as to cause the wheel to oscillate forwardly and rearwardly and also gradually change its position about its axis when the trolley is in service and a clutch arranged between the spring D and the shaft or axle C. The spring D is a relatively heavy, flat coiled spring, preferably formed of metal that is a good electrical conductor, and arranged in a chamber in the body of the wheel B, as shown in Fig. 1, said wheel having a removable portion 1 that forms one wall of said chamber. The clutch previously referred to that is interposed between the spring and the shaft or axle C is preferably of the pawl type and comprises an outer member 2 to which one end of the spring D is securely connected, an inner member 3 formed by a hub or integral portion on the shaft C and a pivotally mounted pawl 4 on the inner member 3 that is normally forced outwardly into engagement with teeth or notches 5 on the inner side of the outer member 2 by means of a coiled compression spring 6, seated in a socket in the inner member 3, as shown in Fig. 2, said pawl being so arranged that it will prevent the outer member 2 of the clutch from turning relatively to the shaft C in clockwise direction, but will permit said outer member to turn freely relatively to the shaft C in the reverse direction or in anti-clockwise direction.

Instead of directly connecting the outer end of the spring D to the wheel B of the trolley, as in the structure shown in our application previously referred to, a split friction ring E is interposed between the wheel B and the outer end of the spring D so as to cause the spring and wheel to be normally connected together, but permit the wheel to rotate under certain conditions, or to shift bodily with relation to the spring, under certain conditions, the outer end of the spring D being connected to one end of the split friction ring in such a way that it normally exerts pressure on said ring in a direction tending to expand the ring, but permits the ring E to contract and slip relatively to the wheel in the event the wheel B is subjected to pressure or a blow in a direction tending to cause it to turn in clockwise direction after the spring D has been wound up tightly. For example, when the trolley is traveling forwardly over the trolley wire around sharp curves, the frictional engagement between the trolley wire and the wheel B, due to the diagonal arrangement of the trolley wire in the grooved portion of the wheel, overcomes the frictional contact between the wheel B and the friction ring E, thus causing the wheel to rotate. Also when the wheel is traveling forwardly over the trolley wire under bridges and other relatively low places when the trolley wire exerts more than the usual pressure on the wheel, the frictional contact between the wheel and the friction ring E is overcome and the wheel will rotate. The friction ring E also permits the wheel B to shift or move bodily with relation to the spring D when the wheel is subjected to a blow from a hanger or other device against which the wheel strikes in traveling forwardly over the trolley wire.

Under normal operating conditions the spring D will be held under tension by the engagement of the wheel B with the trolley wire, the wheel being held in snug engagement with the trolley wire by the upward pressure of the trolley pole and by the force or pressure which the spring D exerts on the wheel B in a direction tending to turn said wheel in anti-clockwise direction, or to the left, looking at Fig. 2. When the wheel passes under the hangers which support the trolley wire the pressure of said wheel on the trolley wire is increased momentarily, due to the increased upward pressure of the trolley pole and the consequent tendency of the wheel to turn in clockwise direction, or to the right (looking at Fig. 2), and thus place the spring D under greater tension. When the wheel B is traveling between two trolley wire hangers, the pressure of said wheel on the trolley wire is momentarily decreased, owing to the upward flexing of the trolley wire, thus causing the wheel to turn slightly to the left or in anti-clockwise direction. At points in the path of travel of the wheel when the wheel is momentarily disengaged from the trolley wire, for example, when the wheel is traveling past a crossing or pan, the wheel will rotate in anti-clockwise direction, or to the left, a considerable distance, due, of course, to the fact that there is nothing to resist the rotary movement of the wheel in this direction, thus causing a different portion of the grooved surface of the wheel to bear against the trolley wire when the wheel is reëngaged with the trolley wire, the reëngagement of the wheel with the trolley wire causing the wheel to turn to the right or in clockwise direction, and thus place the spring D under tension.

While the wheel B normally has a sliding contact with the trolley wire, there are times, such, for example, as when the wheel is traveling forwardly around a sharp curve, that the wheel will rotate, due, of course, to the fact that abnormal pressure which the trolley wire then exerts on the wheel breaks the frictional contact between the wheel and the friction ring E. It will thus be seen that in a trolley of the construction above described the friction ring E performs several functions, namely it prevents the spring D from breaking under excessive strains; it permits the wheel B to rotate when the trolley wire exerts an abnormal pressure on the wheel, thus aiding in the uniform distribution of the wear on the wheel B, and it permits the wheel to shift or move bodily with relation to the spring D when the wheel is subjected to a sudden sharp blow, as, for example, when the wheel strikes a hanger or other obstruction in its path of travel. When the car or vehicle on which the trolley is used is backed up or moved rearwardly, or, in other words, when the wheel is traveling rearwardly over the trolley wire, the wheel B will rotate freely to the left, or in anti-clockwise direction, due, of course, to the fact that there is a clutch interposed between the inner end of the spring D and the axle C on which the wheel B turns.
While it is immaterial how the wheel B is mounted in the harp A of the trolley, we prefer to mount the wheel in the manner described in our pending application previously referred to, as such a construction eliminates arcing when the trolley is in use, and it permits the wheel and its supporting shaft to be easily removed from or arranged in operative position in the harp A, the shaft C being provided at its ends with non-circular-shaped portions that fit in vertically-disposed grooves 7 formed in the inner side faces of the side pieces of the harp A and clamped securely in said side pieces by a screw 8, as shown in Fig. 1, that draws the side pieces of the harp together and causes them to bear snugly against the ends of the shaft C.

With a trolley of the construction above described there is little liability of the trolley being damaged or the trolley wire torn down in the event that the grooved portion of the trolley wheel becomes worn in such a way that the groove of the wheel grips the trolley wire too snugly when the vehicle is traveling forwardly, owing to the fact that the spring and the wheel of the trolley are connected together by a friction device which is capable of giving or yielding under abnormal conditions, said friction device also acting to cushion the blow on the wheel of the trolley that occurs in bridging gaps in the trolley wire and also when the wheel is traveling under crossings, switch points and the hangers that support the trolley wire. It is, of course, impossible to prevent the wheel of a trolley from being subjected to blows when the trolley is in service, but in our improved trolley the blows or shocks to which the wheel is subjected have no injurious effect on the trolley. In fact, said blows or shocks are utilized to bodily shift or move the wheel with relation to the spring D, and thus distribute the "wear" uniformly over the grooved portion of the wheel. As previously stated, the wheel of our improved trolley normally has a sliding contact with the trolley wire, but when the vehicle on which the trolley is used is traveling forwardly under a viaduct or other relatively low place, the friction ring E automatically releases the wheel B of the trolley and permits said wheel to revolve, thus taking off or relieving the strain on the spring D. Also in rounding sharp curves the wheel B of the trolley will rotate, thus eliminating the possibility of the trolley wire groove of the wheel becoming excessively worn at any particular point.

Having thus described our invention, what we claim as new and desire to secure by Letters Patent is:

1. A trolley, comprising a supporting member, and a wheel mounted in said member in such a manner that it normally has a sliding contact with a trolley wire or electrical conductor over which it is traveling forwardly but is capable of revolving and continuing to revolve about its axis when the trolley wire exerts and maintains an abnormal pressure on said wheel.

2. A trolley, comprising, a supporting member, a wheel carried by said member and adapted to coöperate with a trolley wire or electrical conductor, and means whereby said wheel will oscillate back and forth under normal operating conditions in traveling over a straight run and will turn about its axis in traveling around sharp curves.

3. A trolley, comprising a supporting member, a wheel mounted in said member in such a manner that it normally has a sliding contact with the trolley wire or electrical conductor with which it coöperates, means whereby said wheel will oscillate back and forth and turn gradually about its axis sufficiently to prevent any one portion of the wheel from becoming excessively worn when the trolley wire exerts normal pressure on the wheel, and means for permitting said wheel to rotate when traveling forwardly over the trolley wire in case said trolley wire exerts a materially greater pressure on the same than the wheel is subjected to under normal operating conditions in traveling forwardly over a straight run.

4. A trolley, comprising a supporting member, a wheel in said member that is adapted to coöperate with a trolley wire or electrical conductor, means for causing said wheel to normally have a sliding contact with the trolley wire but to oscillate back and forth and gradually turn about its axis so as to distribute the wear uniformly over the entire surface of the wheel when it is traveling forwardly over the trolley wire, and means whereby said wheel will revolve when it is traveling forwardly around sharp curves and will revolve freely when the vehicle on which the trolley is used is moving rearwardly.

5. A trolley, comprising a supporting member, a wheel in said member that is adapted to coöperate with a trolley wire or electrical conductor, a coiled spring combined with said wheel in such a way that it tends to turn the wheel in one direction, and means for permitting the wheel to shift bodily with relation to said spring, and revolve about its axis, when it is subjected to certain conditions while traveling forwardly over the trolley wire.

6. A trolley, comprising a supporting member, a wheel in said member that is adapted to coöperate with a trolley wire or electrical conductor, a coiled spring combined with said wheel in such a way that it normally tends to turn the wheel freely in one direction, and means for permitting said wheel to shift bodily with relation to said spring in the opposite direction, and also rotate about its axis when it is subjected to certain conditions while traveling forwardly over the trolley wire.

7. A trolley, comprising a supporting member, a wheel in said member that is adapted to coöperate with a trolley wire or electrical conductor, a coiled spring for resisting rotary movement of said wheel in one direction, and a friction device that connects said spring to said wheel and permits the wheel to shift bodily with relation to said spring under certain conditions when the wheel is traveling forwardly over the trolley wire.

8. A trolley, comprising a supporting member, a wheel in said member that is adapted to coöperate with a trolley wire or electrical conductor, a coiled spring for resisting rotary movement of said wheel in one direction, a friction device for connecting said spring to said wheel, and a means for permitting said spring to turn or travel around the axis of rotation of said wheel.

9. A trolley, comprising a wheel that is adapted to coöperate with a trolley wire or electrical conductor, a supporting shaft for said wheel, a clutch and a coiled spring arranged between said shaft and wheel, and a friction device for connecting said spring to said wheel.

10. A trolley, comprising a wheel that is adapted to coöperate with a trolley wire or electrical conductor, a supporting shaft for said wheel, a coiled spring arranged inside of said wheel and having its outer end connected to the wheel, and a pawl clutch arranged between said shaft and the inner end of said spring.

11. A trolley, comprising a wheel that is adapted to coöperate with a trolley wire or electrical conductor, a stationary supporting shaft for said wheel, a coiled spring arranged inside of said wheel, a clutch interposed between said shaft and the inner end of said spring, and a friction device for connecting the outer end of said spring to said wheel.

12. A trolley, comprising a wheel that is adapted to coöperate with a trolley wire or electrical conductor, a stationary supporting shaft for said wheel, a flexible connection between said shaft and wheel which tends to restrict the rotary movement of said wheel in one direction, means for permitting said wheel to turn freely in the opposite direction, and means whereby an abnormal pressure on the wheel causes it to shift bodily with relation to said flexible connection and also revolve if said abnormal pressure is continued.

13. A trolley, comprising a supporting member, a wheel in said member that is adapted to coöperate with a trolley wire or electrical conductor, a coiled spring combined with said wheel in such a manner as to tend to limit the rotative movement of said wheel in one direction, and a friction ring that constitutes the connection between said spring and wheel.

14. A trolley, comprising a supporting member, a wheel in said member that is adapted to coöperate with a trolley wire or electrical conductor, a friction ring arranged in engagement with said wheel, and a coiled spring connected to said friction ring in such a manner that it exerts pressure on said friction ring in a direction tending to expand it.

15. A trolley, comprising a supporting member, a wheel in said member that is adapted to coöperate with a trolley wire or electrical conductor, a stationary shaft for said wheel, a coiled spring arranged in a chamber in said wheel, a friction ring connected to the outer end of said spring and arranged in frictional engagement with said wheel, and a clutch interposed between said shaft and the inner end of said spring.

16. A trolley, comprising a supporting member, a wheel in said member that is adapted to coöperate with a trolley wire or electrical conductor, a stationary supporting shaft for said wheel, a coiled spring arranged in a chamber in said wheel, a split friction ring surrounding said spring and arranged in engagement with said wheel, the outer end of said spring being connected to said friction ring in such a manner that the tension of said spring tends to hold said friction ring expanded, and a pawl clutch arranged between the inner end of said spring and said shaft.

JOSEPH L. GUTWEILER.
FREDERICK W. KUBLIN.